(12) United States Patent
Indiresan et al.

(10) Patent No.: US 7,586,915 B1
(45) Date of Patent: Sep. 8, 2009

(54) TECHNIQUE FOR COUPLING ENTITIES VIA VIRTUAL PORTS

(75) Inventors: Atri Indiresan, Sunnyvale, CA (US); Giovanni Meo, San Francisco, CA (US); Michael T. Wu, Palo Alto, CA (US); Roberto M. Kobo, Pleasanton, CA (US); Shakeel Ahmed, Sunnyvale, CA (US); Tawei Liao, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 857 days.

(21) Appl. No.: 10/691,830

(22) Filed: Oct. 23, 2003

(51) Int. Cl.
    *H04L 12/56* (2006.01)
(52) U.S. Cl. .................. 370/392; 370/395.53
(58) Field of Classification Search ............ 370/395.54, 370/395.2, 395.31, 395.3, 395.53, 388, 392, 370/409, 397, 389, 395.5, 401
    See application file for complete search history.

(56) References Cited

U.S. PATENT DOCUMENTS

| 5,018,137 | A | 5/1991 | Backes et al. |
|---|---|---|---|
| 5,845,068 | A | 12/1998 | Winiger |
| 5,959,968 | A | 9/1999 | Chin et al. |
| 6,061,349 | A | 5/2000 | Coile et al. |
| 6,104,717 | A | 8/2000 | Coile et al. |
| 6,618,388 | B2 * | 9/2003 | Yip et al. ............ 370/401 |
| 6,937,574 | B1 * | 8/2005 | Delaney et al. ....... 370/254 |
| 7,286,528 | B1 * | 10/2007 | Pannell ............... 370/389 |
| 2003/0142674 | A1 * | 7/2003 | Casey ................ 370/393 |
| 2003/0147405 | A1 * | 8/2003 | Khill ................. 370/401 |
| 2004/0010618 | A1 * | 1/2004 | Thomas .............. 709/245 |
| 2004/0017816 | A1 * | 1/2004 | Ishwar et al. ........ 370/395.53 |

* cited by examiner

*Primary Examiner*—Ricky Ngo
*Assistant Examiner*—Pao Sinkantarakorn
(74) *Attorney, Agent, or Firm*—Cesari and McKenna LLP

(57) ABSTRACT

A technique transfers data between geographically dispersed entities belonging to a virtual-local-area network (VLAN). According to the technique, geographically dispersed entities communicate via software-defined virtual ports that "appear" as physical ports to the entities. Each virtual port, in turn, is associated with one or more connections wherein each connection may be associated with one or more VLANs. Data generated on a particular VLAN that is destined for a remote entity is forwarded to a virtual port which, in turn, transfers the data to the remote entity over the connection associated with the VLAN. Moreover, state is maintained at each virtual port for each connection, thereby enabling the virtual ports to support various protocols that operate with physical ports.

29 Claims, 11 Drawing Sheets

TECHNIQUE FOR COUPLING ENTITIES VIA VIRTUAL PORTS

BACKGROUND OF THE INVENTION

1. Field of the Invention

The present invention relates to data networking and, in particular, to a technique for coupling geographically dispersed entities belonging to a virtual local area network (VLAN) via virtual ports.

2. Background Information

A data network is a geographically distributed collection of interconnected communication links and segments for transporting data between nodes, such as computers. The nodes typically transport the data over the network by exchanging discrete frames or packets containing the data in accordance with various pre-defined protocols, such as the Transmission Control Protocol/Internet Protocol (TCP/IP) or the Internetwork Packet eXchange (IPX) protocol. In this context, a protocol consists of a set of rules defining how the nodes interact with each other.

Many types of networks are available, with types ranging from local area networks (LANs) to wide area networks (WANs). LANs typically connect nodes, such as personal computers and workstations, over dedicated private communication links located in the same general physical location, such as a building or a campus to form a private network. WANs, on the other hand, typically connect large numbers of geographically dispersed nodes over long-distance communications links, such as common carrier telephone lines. The Internet is an example of a WAN that connects disparate networks throughout the world, providing global communication between nodes contained in various networks. WANs often comprise a complex network of intermediate network nodes, such as routers or switches, that are interconnected to form the WAN and are often configured to perform various functions associated with transferring traffic through the WAN.

Some organizations employ virtual LANs (VLANs) in their private networks to "logically" group entities, such as users, servers, and other resources within the organization. A VLAN is a logical group of entities, such as users and servers, which appear to one another as if they are on the same physical LAN segment, even though they may be spread across a large network comprising many different physical segments. A VLAN operates at the data link layer, which is layer-2 (L2) of the Open Systems Interconnect (OSI) reference model.

In some organizations, entities belonging to a VLAN group may be dispersed over a wide geographical area. To interconnect the geographically dispersed entities, an organization may subscribe to a service provider (SP) that provides a WAN to enable communication among the various dispersed entities. Here, the organization may employ one or more routers to interconnect the various dispersed entities to the SP's WAN.

Some SPs employ the Asynchronous Transfer Mode (ATM) protocol to carry large volumes of traffic generated by various organizations through the WAN. Moreover, the SP may employ ATM virtual connections (VCs), wherein each VC carries the traffic for a particular organization's VLAN. By employing VCs in this manner, an SP can ensure that traffic generated on one organization's VLAN does not interfere with traffic generated on another organization's VLAN.

One problem with using VCs to carry VLAN traffic is that the VCs may not appear transparent to various L2 protocols operated over the VLAN. For example, nodes belonging to a VLAN often run the spanning-tree protocol (STP) and periodically generate bridged-protocol data units (BPDUs). The STP treats a physical port on these nodes as a single physical point-to-point data link and consequently sends only one copy of a generated BDPU to a given port. An ATM physical port, however, may be associated with a plurality of VCs that couple various network devices belonging to the VLAN. Since only one BPDU is generated for the ATM port, the STP may not operate properly as there will not be enough BPDUs for transfer over all the VCs associated with the VLAN.

Likewise, in accordance with the STP, a physical port may be placed in a blocked state to avoid loops in a particular VLAN's topology. This may pose a problem with ATM implementations wherein a blocked VC blocks an entire ATM port. For example, if the ATM port is associated with a plurality of VCs and each VC is associated with a different VLAN, blocking a VC to meet the requirements of the STP for a particular VLAN may inadvertently cause traffic on the other VLANs to be blocked as well.

Another problem associated with coupling VLANs via VCs is that in some intermediate nodes a separate control structure may be maintained for each VC. The control structure typically holds information associated with the connection, such as connection status and various statistics. Often, the number of control structures available in an intermediate node is limited due to limited resources available to the node, e.g., a limited amount of memory storage. Consequently, if the number of dispersed entities in a VLAN is quite numerous and requires many VCs, an intermediate node in the network may not have sufficient resources to maintain control structures for all the VCs needed to couple the entities belonging to the VLAN.

SUMMARY OF THE INVENTION

The present invention relates to a technique for efficiently transferring data between geographically dispersed entities belonging to a virtual-local-area network (VLAN). According to the technique, the geographically dispersed entities communicate via software-defined virtual ports that "appear" as physical ports to the entities. Each virtual port, in turn, is associated with one or more connections wherein each connection may be associated with a VLAN. Data generated on a particular VLAN that is destined for a remote entity is forwarded to a virtual port which, in turn, transfers the data to the remote entity over the connection associated with the VLAN. Moreover, state is maintained at each virtual port for each connection thereby enabling the virtual ports to support various protocols that operate with physical ports.

Briefly, an intermediate node acquires a packet destined for a destination node from a source node. The intermediate node associates the packet with a VLAN and identifies (i) a virtual port, through which the destination node can be reached, and (ii) a connection associated with the packet's VLAN. The intermediate node then transfers the packet onto the connection towards the destination node.

In the illustrated embodiment, geographically dispersed entities (e.g., end nodes) belonging to various VLANs are coupled to "customer-edge" (CE) intermediate nodes that, in turn, are coupled to "provider-edge" (PE) nodes contained in a wide-area network (WAN). A first entity (source node) belonging to a VLAN communicates with a second entity (destination node) belonging to the same VLAN by transferring a data packet (i.e., the original packet) containing the destination address of the second node to a first CE intermediate node. The first CE node acquires the original packet and identifies a VLAN associated with the packet. The first CE node then uses the destination address contained in the original packet and the VLAN to identify a virtual port that is used to reach the destination node. Using the VLAN information associated with the packet, the first CE node further identifies a software-defined connection, e.g., a virtual connection (VC), used to carry the VLAN's traffic. The first CE intermediate node encapsulates the original packet to produce a singly encapsulated packet and transfers the packet via the connection to a first PE intermediate node contained in the WAN.

The first PE intermediate node identifies an internal VLAN associated with the destination node. Using the internal VLAN information and destination address contained in the data, the first PE node identifies a virtual port and a software-defined connection (e.g., a VC) used to reach the destination node in a manner as described above. The first PE node encapsulates the singly encapsulated packet to create a doubly encapsulated packet and transfers that packet to a second PE node via the connection. The second PE node acquires the doubly encapsulated data, decapsulates it yielding the singly encapsulated data. Using the VLAN and destination address information in the singly encapsulated packet, the second PE node identifies a virtual port and a software-defined connection (e.g., a VC) associated with the destination node. The second PE node transfers the singly encapsulated packet over the connection to a second CE intermediate node. The second CE intermediate node acquires the singly encapsulated packet and decapsulates it yielding the original packet. The second CE node then processes the original packet, which may include forwarding it to the second entity.

Advantageously, the inventive technique is an improvement over prior schemes in that the virtual port appears as a "physical" port and enables certain protocols that deal with physical ports to operate where they may not otherwise operate using the prior schemes, such as those that rely on logical communication links like VCs. Moreover, the inventive technique conserves resources in that it enables many connections (e.g., VCs) associated with various VLANs to be associated with a single virtual port. The virtual port in turn is associated with a single control structure. As a result, many connections may be associated with a single control structure, thereby obviating having to maintain a separate control structure for each connection and consequently consume additional resources.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN
ILLUSTRATIVE EMBODIMENT

Figure 1:
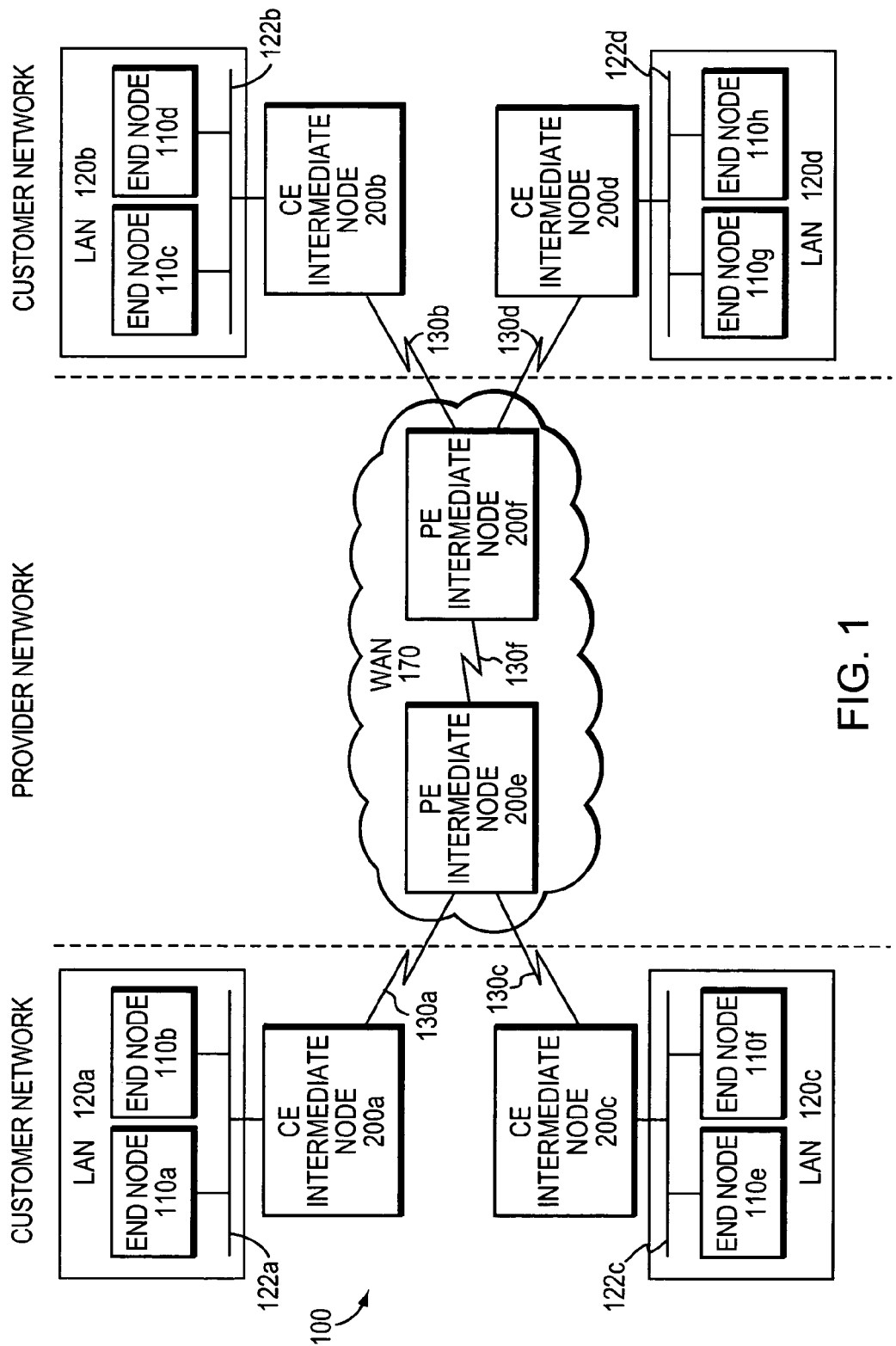
FIG. 1 is a schematic block diagram of a data network that may be advantageously used with the present invention.

FIG. 1 is a schematic block diagram of an exemplary data network 100 that may be advantageously used with the present invention. The network 100 comprises a collection of communication links and segments connected to a plurality of nodes, such as end nodes 110 and intermediate nodes 200. The network links and segments may comprise local area networks (LANs) 120, LAN links 122, a wide-area network (WAN) 170, and WAN links 130 interconnected by intermediate nodes 200 to form an internetwork of computer nodes. These internetworked nodes communicate by exchanging data according to a predefined set of protocols, such as the Transmission Control Protocol/Internet Protocol (TCP/IP) and the Institute of Electrical and Electronics Engineers (IEEE) 802.3 and 802.1Q protocols.

Illustratively, data network 100 comprises a customer network portion belonging to a customer and a provider network portion belonging to a service provider (SP). The customer network portion comprises various geographically dispersed networks, such as LANs 120a-d, coupled to customer edge (CE) intermediate nodes (e.g. nodes 200a-d) that reside on e.g., the customer's premises. The LANs 120a-d comprise end nodes 110 which may be computer systems, such as workstations and/or personal computers, capable of transferring and acquiring data packets to and from the network 100. The provider network is illustratively a conventional service provider network, such as an Internet service provider (ISP) network comprising various intermediate nodes coupled to form WAN 170. These nodes illustratively reside on the provider's premises and include provider edge (PE) nodes 200e-f which are coupled to the various CE intermediate nodes 200a-d via e.g., high-speed data links 130. The PE nodes enable LANs 120a-d to access the WAN 170 and exchange information (e.g., data packets) between the end nodes 110 contained in the LANs 120.

Figure 2:
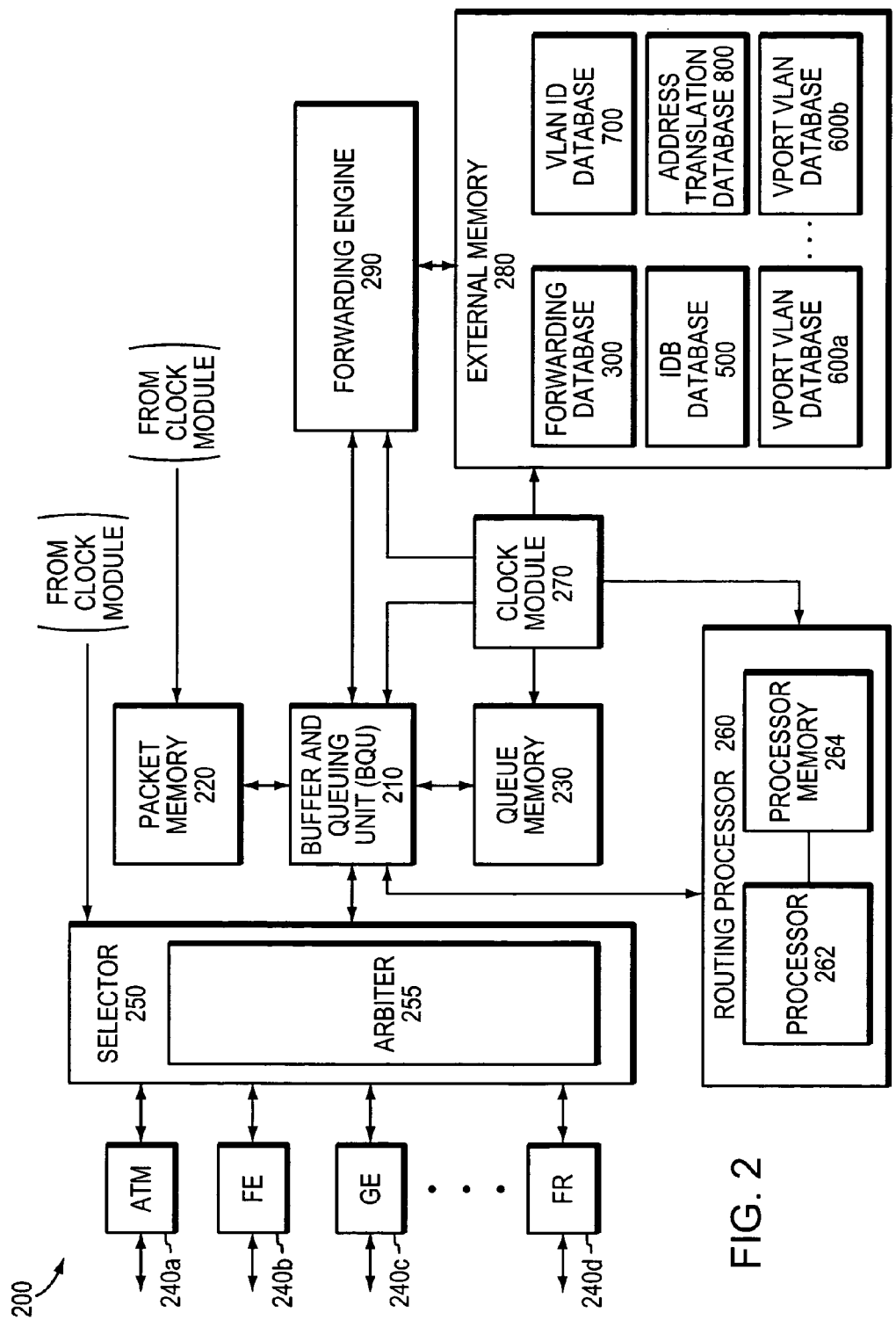
FIG. 2 is a high-level partial schematic block diagram of an intermediate node that may be advantageously used with the present invention.

FIG. 2 is a high-level partial schematic block diagram of intermediate node 200, which illustratively is a switch. Operation of switch 200 will be described with respect to layer-2 (L2) and layer-3 (L3) switching which are the data-link and network layers of the Open Systems Interconnect (OSI) reference model, respectively, although the switch 200 may be programmed for other applications. A suitable intermediate network device platform that may be used with the present invention includes, but is not limited to, the Cisco 7600 series switch commercially available from Cisco Systems, Inc. of San Jose, Calif.

Switch 200 comprises a plurality of interconnected components including a forwarding engine 290, various memories, queuing logic 210, selector 250, routing processor 260, and network interface cards (line cards) 240. A clock module 270 synchronously controls operations of various components contained in switch 200, although it should be noted that arrayed elements contained in the forwarding engine 290 (described below) may be operatively configured to function asynchronously. In the illustrative embodiment, the clock module 270 generates clock signals at a frequency of, e.g., 200 megahertz (i.e., 5 nanosecond clock cycles), and globally distributes them via clock lines to the various components of the intermediate node 200.

The memories generally comprise computer readable random-access memory (RAM) storage locations addressable by the forwarding engine 290 and routing processor 260 for storing software programs and data structures accessed by the various components, including software programs and data structures that implement aspects of the inventive technique. An operating system, portions of which are typically resident in memory and executed by the forwarding engine 290, functionally organizes the node 200 by, inter alia, invoking network operations in support of software processes, including processes that implement the inventive technique, executing on node 200. It will be apparent to those skilled in the art that other memory means, including various computer readable mediums, such as disk storage and/or flash memory, may be used for storing and executing program instructions pertaining to the inventive technique and mechanism described herein.

A buffer and queuing unit (BQU) 210 is connected to a packet memory 220 for storing packets and a queue memory 230 for storing network-layer and link-layer headers of the packets on data structures, such as linked lists, organized as queues (not shown). The BQU 210 further comprises data interface circuitry for interconnecting the forwarding engine 290 with the line cards 240 via a selector circuit 250 having an arbiter 255. The line cards 240 may comprise, e.g., Asynchronous Transfer Mode (ATM), Fast Ethernet (FE), Gigabit Ethernet (GE) and Frame Relay (FR) ports, each of which includes conventional interface circuitry that may incorporate the signal, electrical and mechanical characteristics, and interchange circuits, needed to interface the cards with the physical media and protocols running over that media.

A routing processor 260 comprises a conventional processor 262 coupled to a processor memory 264 and is configured to execute, inter alia, various conventional routing protocols, such as the Open Shortest-Path First (OSPF) protocol, for communication directly with the forwarding engine 290. The routing protocols generally comprise topological information exchanges between intermediate nodes to determine preferred paths through the network based on, e.g., destination IP addresses. These protocols provide information used by the processor 260 to create and maintain various forwarding databases.

The databases are loaded into a partitioned external memory 280 and are used by the forwarding engine 290 to perform, e.g., layer-2 (L2) and layer-3 (L3) forwarding operations. When processing a packet's header in accordance with L2 forwarding, for example, engine 290 applies a destination media-access control (MAC) address contained in the header and a virtual-local-area network (VLAN) identifier (ID) associated with the packet to the forwarding database 300 to identify a destination port where a destination node associated the destination address may be reached.

The forwarding engine 290 may comprise a symmetric multiprocessor system having a plurality of processing elements (not shown). Each processing element illustratively includes a pipelined processor that contains, inter alia, one or more arithmetic logic units (ALUs) and a register file having a plurality of general purpose registers that store intermediate result information processed by the ALUs. The processing elements may be arrayed into multiple rows and columns and further configured as a multi-dimensioned systolic array. Illustratively, the processing elements are arrayed as four (4) rows and eight (8) columns in a 4×8 arrayed configuration that is embedded between an input buffer (not shown) and an output buffer (not shown). However, it should be noted that other arrangements, such as an 8×8-arrayed configuration, may be advantageously used with the present invention.

The processing elements of each row are configured as stages of a "pipeline" that sequentially execute operations on transient data (e.g., packet headers) loaded by the input buffer, whereas the processing elements of each column operate in parallel to perform substantially the same operation on the transient data, but with a shifted phase. Each phase comprises a predetermined period of cycles, e.g., 128 cycles. Sequencing circuitry of the input buffer controls the processing elements of each pipeline by ensuring that each element completes processing of current transient data before loading new transient data into the pipeline at a new phase. In general, a new phase of processing is started, i.e., a context switch is performed, when the elements finish processing their current transient data (current context) and new incoming transient data (new context) is completely received by the input buffer.

The forwarding engine 290 is coupled to external memory 280 a portion of which is partitioned into a plurality of "column" memories wherein each column memory is coupled to a particular column of processing elements. Memory 280 is preferably organized as one or more banks and is implemented using fast-cycle-random-access-memory (FCRAM) devices, although other devices, such as reduced-latency-dynamic-random-access-memory (RLDRAM) devices, could be used. The external memory 280 stores non-transient data organized as a series of data structures for use in processing the transient data. The data structures include the forwarding database 300, an interface-descriptor block (IDB) database 500, one or more virtual-port (VPORT) VLAN databases 600, a VLAN identifier (ID) database 700, and an address translation database 800.

Figure 3:
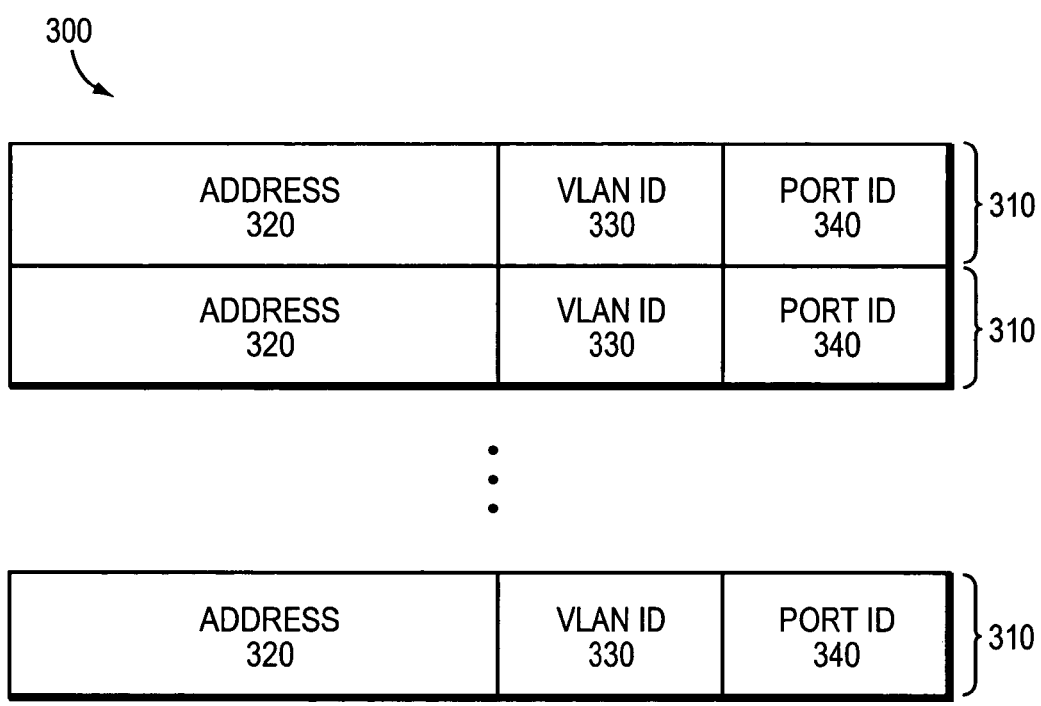
FIG. 3 is a schematic block diagram of a forwarding database that may be advantageously used with the present invention.

FIG. 3 is a schematic block diagram of forwarding database 300 illustratively organized as a table comprising one or more entries 310 wherein each entry 310 is configured to hold information associated with e.g., a node contained in network 100. Entry 310 comprises an address field 320, a VLAN ID field 330 and a port ID field 340. The address field 320 holds a value that represents an address of a node associated with the entry, such as a L2 address of node 110a, and the VLAN ID field 330 holds an identifier that identifies a VLAN associated with the node.

The port ID field 340 holds an identifier that identifies a port through which the node can be reached. This port may be a physical port contained e.g., on a line card 240 or a virtual port. A virtual port, as used herein, relates to a software-defined entity (port) that appears as a physical port, though it is not actually a physical port. As will be described further below, a virtual port may be associated with one or more VLANs wherein is each VLAN is associated with a connection, such as an ATM virtual connection (VC).

Data packets transferred via ports contained in node 200 may conform to the IEEE 802.1Q (802.1Q) standard described in the "IEEE Standards for Local and Metropolitan Area Networks: Virtual Bridged Local Area Networks" available from the Institute of Electrical and Electronics Engineers, New York, N.Y. The 802.1Q standard defines the architecture, protocols, and mappings for bridges/switches to provide interoperability and consistent management of VLANs. Packets conforming to this standard include an ID that identifies a VLAN associated with the packet.

Figure 4:
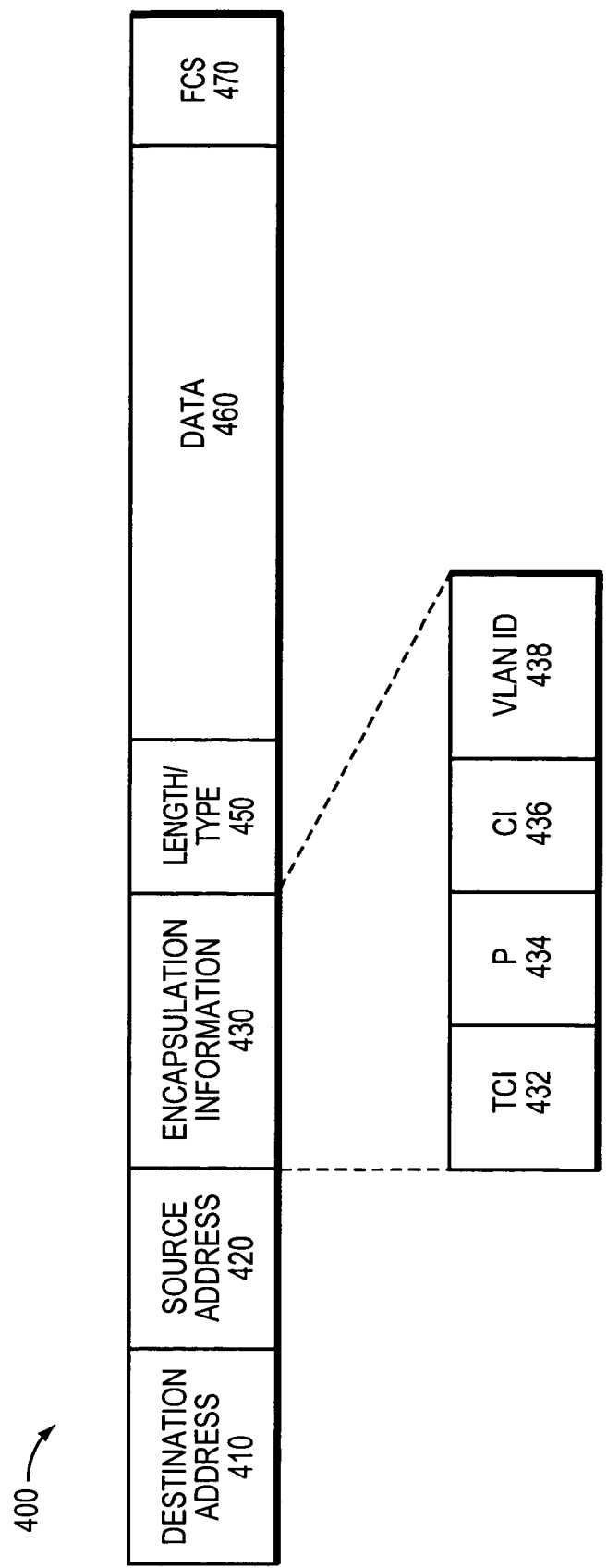
FIG. 4 is a schematic block diagram of a singly encapsulated data packet configured in accordance with the Institute of Electrical and Electronics Engineers (IEEE) 802.1Q standard that may be advantageously used with the present invention.

FIG. 4 is a schematic block diagram of a singly encapsulated data packet 400 configured in accordance with the IEEE 802.1Q standard (802.1Q) that may be advantageously used with the present invention. Packet 400 comprises a destination address field 410 and a source address field 420, which hold MAC addresses of destination and source nodes associated with the packet 400, respectively. A data field 460 holds data (payload) transferred by the packet 400 and a frame-check sequence (FCS) field 470 holds a holds value, such as a cyclic-redundancy check (CRC), that may be used to "error check" the packet 400. A length/type field 450 holds a length value or a type designator depending on the value contained therein. Typically, if this value is less than decimal 1536 (0x0600 hexadecimal), the value indicates a length of the packet in octets (bytes). If the value is greater than or equal to decimal 1536, the value typically indicates a "protocol type" that designates the nature of a protocol associated with the packet. For example, a hexadecimal value of 0x0800 in the length/type field 450 indicates the packet contains information associated with the Internet Protocol (IP).

An encapsulation information field 430 contains information associated with 802.1Q. Specifically, field 430 contains a tag control information (TCI) field 432, a priority (P) field 434, a canonical indicator (CI) field 436 and a VLAN identifier (ID) field 438. The TCI field 432 holds a value (e.g., hexadecimal 0x8100) that indicates the packet is interpreted as e.g., an 802.1Q type packet. The priority field 434 holds an indicator that indicates a priority level (e.g., 0 through 7) and the CI field 436 holds an indicator that indicates whether the source and destination addresses are in canonical format. The VLAN tag field 440 holds a VLAN identifier (ID) that identifies the VLAN associated with the packet.

The present invention relates to a technique for efficiently transferring data between geographically dispersed entities belonging to a virtual-local-area network (VLAN). According to the technique, the geographically dispersed entities communicate via software-defined virtual ports that "appear" as physical ports to the entities. Each virtual port, in turn, is associated with one or more software-defined connections wherein each connection may be associated with one or more VLANs. Data generated on a particular VLAN that is destined for a remote entity is forwarded to a virtual port which, in turn, transfers the data to the remote entity over the software-defined connection associated with the VLAN. Moreover, state is maintained at each virtual port for each connection thereby enabling the virtual ports to support various protocols that operate with physical ports.

Figure 5:
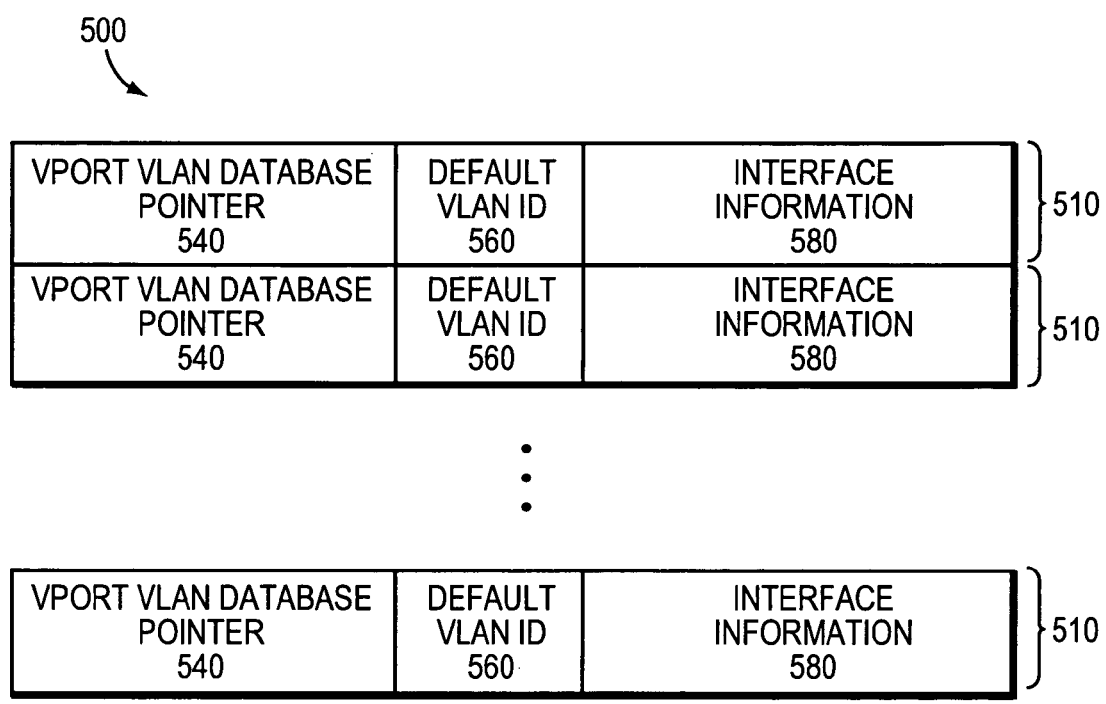
FIG. 5 is a schematic block diagram of an interface-descriptor block (IDB) database that may be advantageously used with the present invention.

IDB database 500 comprises one or more interface descriptor blocks (IDBs) wherein each IDB represents a physical or virtual port contained in node 200. FIG. 5 is a schematic block diagram of an IDB database 500 that may be advantageously used with the present invention. Database 500 is illustratively depicted as a table containing a plurality of entries 510. Each entry 510 is indexed by a port ID of the port represented by the entry and contains a virtual port (VPORT) VLAN database pointer field 540, a default VLAN ID field 560 and an interface information field 580. The interface information field 580 holds various information about the port, such as status, various flag fields and so on. The default VLAN ID field 560 holds an identifier that identifies a default VLAN that is associated with various packets acquired on the port. For example, if a packet acquired on the port contains a VLAN ID, such as an 802.1Q type packet, the packet is associated with the VLAN indicated by the VLAN ID contained in the packet. Otherwise, if the acquired packet does not contain a VLAN ID, the packet is associated with the VLAN identified by the default VLAN ID field 560 of the IDB entry 500 for the port.

Figure 6:
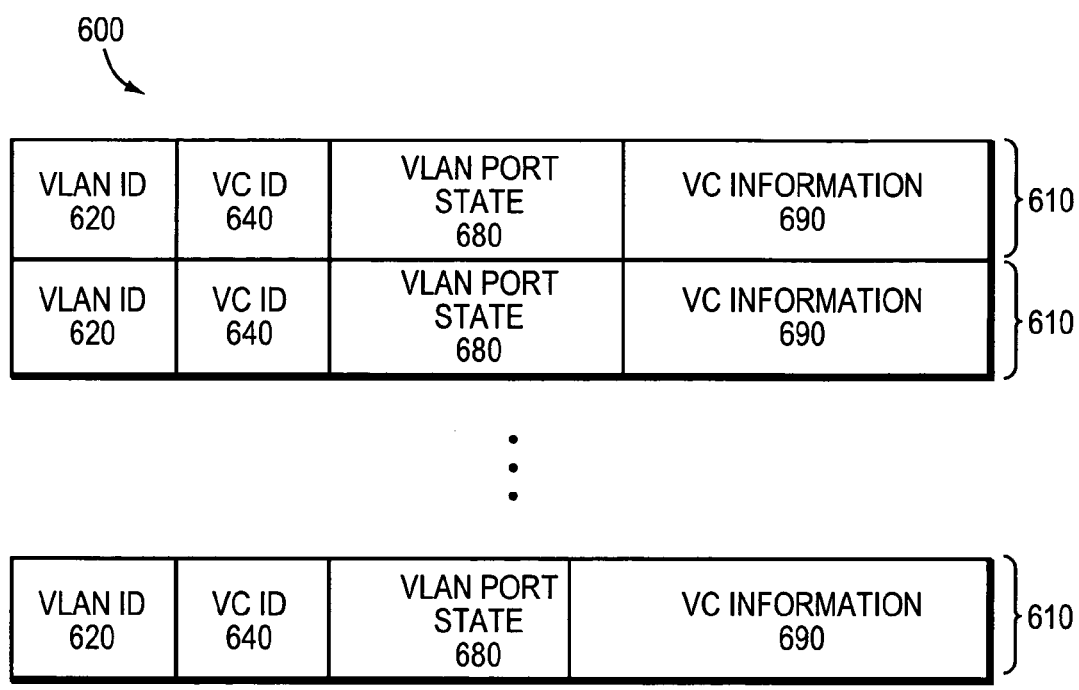
FIG. 6 is a schematic block diagram of a virtual port virtual-local-area network (VLAN) database that may be advantageously used with the present invention.

The VPORT VLAN database pointer field 540 illustratively holds an address of a VPORT VLAN database 600 that contains information of VLANs associated with a virtual port represented by an IDB entry 510. FIG. 6 is a schematic block diagram of VPORT VLAN database 600 that may be advantageously used with the present invention. Database 600 is illustratively a table containing a plurality of entries 610 wherein each entry 610 represents a VLAN that is associated with the virtual port. Each entry 610 contains a VLAN ID field 620, a virtual connection (VC) ID field 640, a VLAN port state field 680 and a VC information field 690. The VLAN port state field 680 holds information about the state of a VLAN port associated with the VLAN. This information 680 illustratively includes various spanning-tree protocol (STP) states, such as blocked, listening, learning, forwarding, and disabled. The STP is described in the Institute of Electrical and Electronics Engineers (IEEE) standard 802.1D, "Standard for Local Area Network MAC (Media Access Control) Bridges," available from the IEEE. The VLAN ID field 620 contains an identifier that identifies the VLAN associated with the entry 610 and the VC ID field 640 contains an identifier of a connection, e.g., an ATM VC, associated with the VLAN. Illustratively, the connection is a software-defined connection that takes the place of an actual physical point-to-point connection that is typically associated with a VLAN port. The VC information field 690 contains other information associated with the connection represented by the VC ID 640, such as, for example, connection status.

Figure 7:
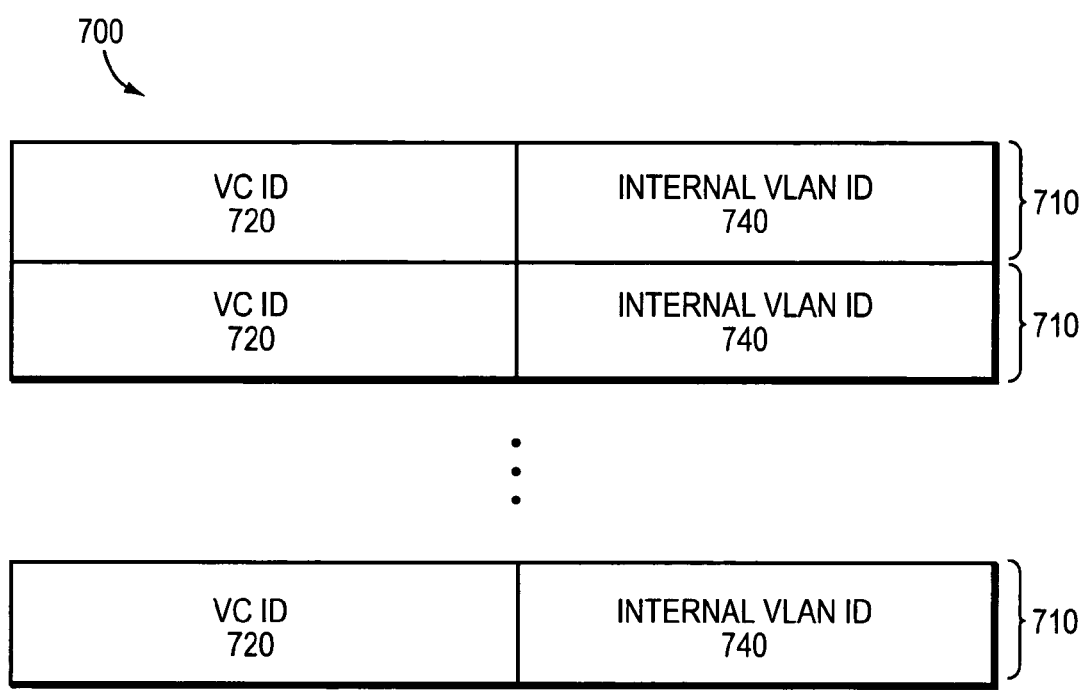
FIG. 7 is a schematic block diagram of a VLAN identifier (ID) database that may be advantageously used with the present invention.

Packets are transferred between PE nodes 200 contained in the WAN 170 via internal VLANs contained within WAN 170. An internal VLAN used to carry a packet is determined by applying a VC ID associated with the packet to the VLAN ID database 700. Illustratively, the VC ID associated with the packet is the VC ID that identifies the connection that carried the packet to the PE node 200. FIG. 7 is a schematic block diagram of a VLAN ID database 700 that may be advantageously used with the present invention. Database 700 is illustratively a table comprising one or more entries 710, wherein each entry 710 "maps" a VC ID associated with a packet to an "identifier" associated with an internal VLAN contained within WAN 170, i.e., an internal VLAN ID. Specifically, entry 710 contains a VC ID field 720 and an internal VLAN ID field 740. The VC ID field 720 holds a VC ID associated with a packet and the internal VLAN ID field 740 holds an identifier associated with an internal VLAN.

As noted above, the internal VLAN used to carry a packet is determined by applying a VC ID associated with the packet to the VLAN ID database 700. Specifically, the VC ID associated with the packet is compared with the VC IDs 720 contained in the table to determine if a VC ID 720 of an entry 710 matches the VC ID associated with the packet. If so, the internal VLAN ID 740 of the matching entry 710 is used to identify the internal VLAN that carries the packet within the WAN 170. For example, assume PE node 200e acquires a packet from CE node 200a on a connection associated with a VC ID value of 5. Further assume that database 700 contains an entry 710 whose VC ID field 720 and internal VLAN ID field 740 contain the values 5 and 7, respectively. Node 200e compares the VC ID associated with the packet, e.g., 5, with the VC IDs 720 of the entries in the table 700 and locates a matching entry 710 i.e., the entry 710 whose VC ID field 720 and internal VLAN ID field 740 contain the values 5 and 7, respectively. Node 200e then uses the internal VLAN ID 740 of the matching entry, i.e., 7, to identify the internal VLAN that carries the packet within the WAN 170.

Certain destination addresses contained in a packet originating external to the provider's network may not be handled properly within the internal VLANs contained within the provider's network. For example, a packet originating in the customer network that contains a multicast address which identifies the packet as an IEEE 802.1D bridged-protocol-data unit (BPDU) may be inadvertently interpreted as a BPDU generated for the provider's network. To obviate mishandling packets containing certain destination addresses, the PE nodes 200 are configured to modify the destination address of these packets with an address that enables the packets to be handled properly within the provider's network. Specifically in accordance with the inventive technique, the destination addresses within these packets are translated to "internal destination addresses" that are used when the packets are transferred within the provider's network. Address translation database 800 contains information that is used to perform this translation.

Figure 8:
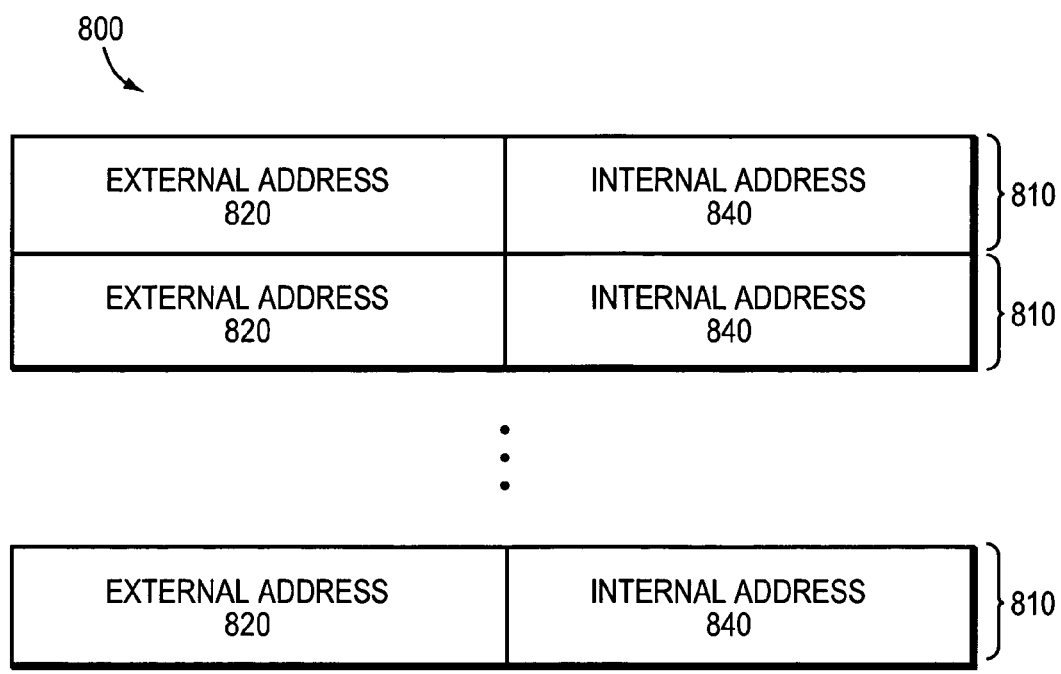
FIG. 8 is a schematic block diagram of a media-access control (MAC) address translation database that may be advantageously used with the present invention.

FIG. 8 illustrates an address translation database 800 that may be advantageously used with the present invention. Database 800 is illustratively organized as a table containing one or more entries 810, wherein each entry 810 contains an external address field 820 and an internal address field 840. The external address field 820 holds an address, e.g., a MAC address, associated with a destination address contained in a packet that is generated external to the provider's network. The internal address field 840 holds an address associated with an internal address that is used as a "substitute" destination address for the externally generated destination address when the packet is transferred in the provider's network. Node 200 "translates" a destination address contained in a packet that was generated external to the provider's network by applying the externally generated address to the database 800 to locate an entry 810 whose external address field 820 contains a value that matches the externally generated address. If a matching entry 810 is found, node 200 replaces the externally generated destination address in the packet with the content of the internal address field 840 of the matching entry 810.

Figure 9:
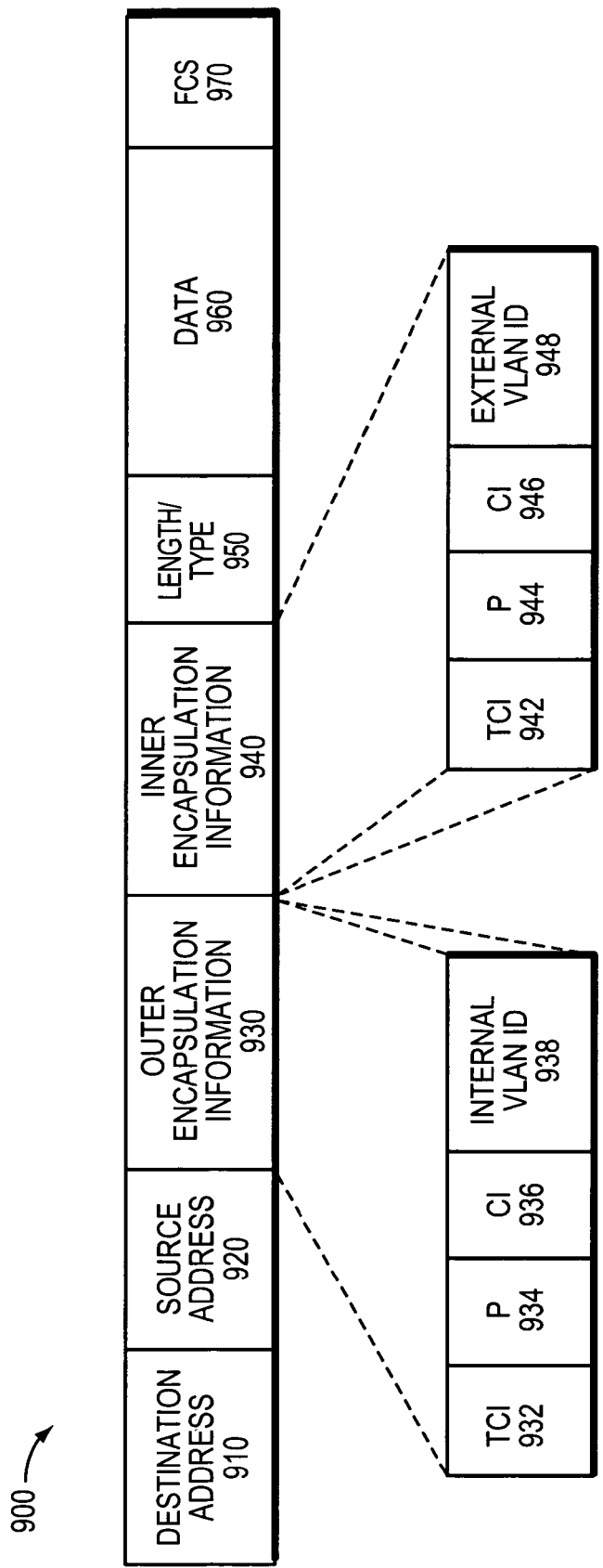
FIG. 9 is a schematic block diagram of a doubly encapsulated packet that may be advantageously used with the present invention.

Illustratively, packets transferred between the CE nodes 200a-d (FIG. 1) and the PE nodes 200e-f are singly encapsulated in accordance with 802.1Q, whereas packets transferred between PE nodes 200e-f are doubly encapsulated as "802.1Q-in-802.1Q" packets. FIG. 9 is a schematic block diagram of a doubly encapsulated packet 900 that may be advantageously used with the present invention. Packet 900 is illustratively an 802.1Q-in-802.1Q packet containing a destination address field 910, a source address field 920, an outer encapsulation information field 930, an inner encapsulation information field 940, a length/type field 950, a data field 960 and an FCS field 970. The destination address field 910, source address field 920, length/type 950 field, data field 960 and FCS field 970 contain information similar to the information contained in the destination address field 410, source address field 420, length/type field 450, data field 460 and FCS field 470, respectively, described above.

The outer encapsulation information field 930 and inner encapsulation information field 940, likewise, contain information similar to the information contained in the encapsulation information field 430 also described above. Specifically, the TCI fields 932, 942 contain tag control information, the priority (P) fields 934, 944 contain priority information, the CI fields 936, 946 contain canonical indicators, and the VLAN ID fields 938, 948 contain a VLAN ID, as described above.

In the doubly encapsulated packet, the content of the inner encapsulation information field 940 illustratively contains information specified in the encapsulation field 430 of an 802.1Q type packet acquired by the PE node 200. Thus, illustratively the TCI field 942, priority (P) field 944, CI field 946 and external VLAN ID field 948 contain information contained in the TCI field 432, priority (P) field 434, CI field 436 and VLAN ID field 438 of the acquired singly encapsulated packet 400, respectively. The content of the outer encapsulation information field 930 illustratively contains a TCI 932, priority (P) 934, CI 936 and internal VLAN ID 938 associated with an internal VLAN, as will be described further below.

Figure 10A:
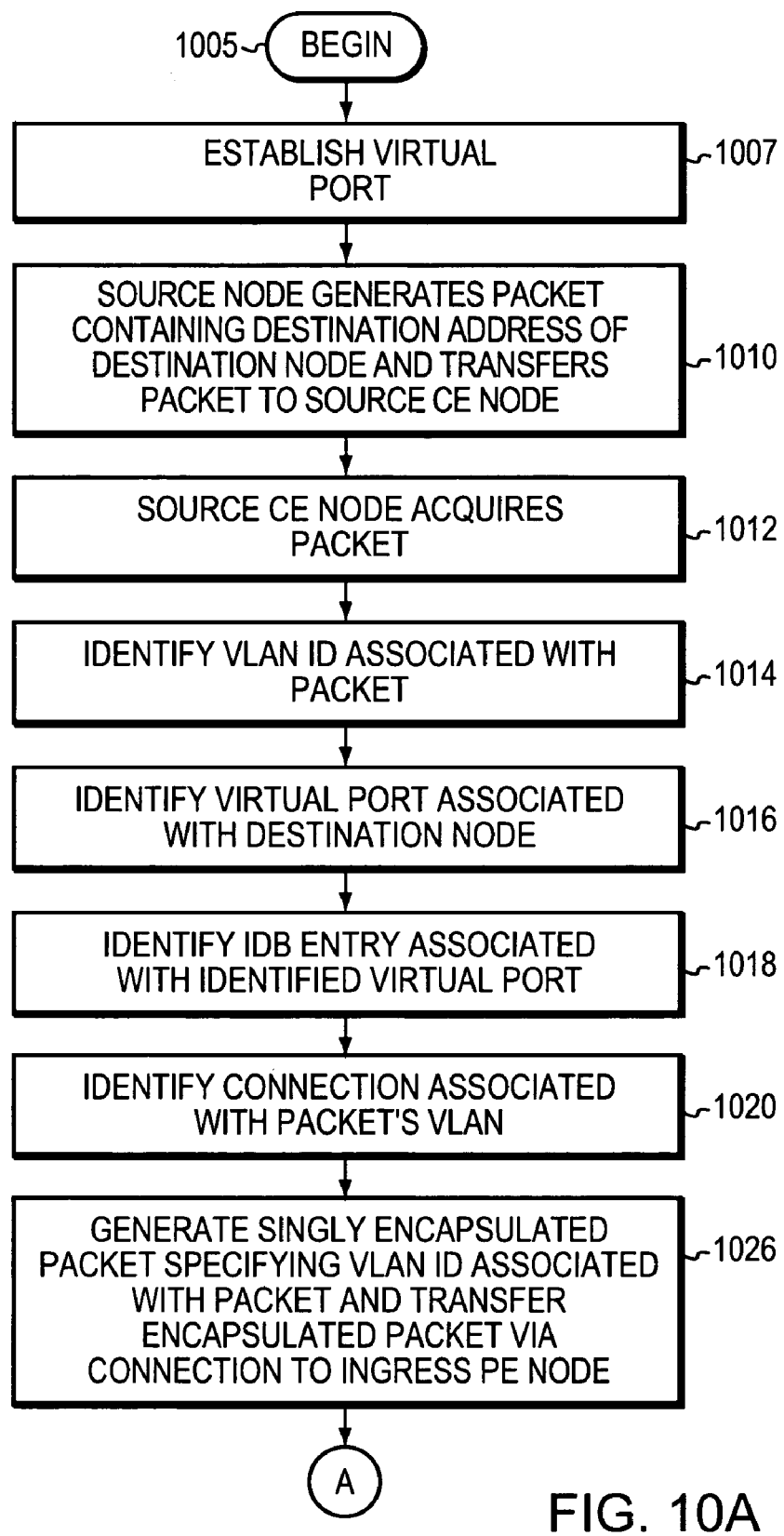
FIGS. 10A-B are flow diagrams of a sequence of steps that may be used to transfer a packet from a source node to a destination node in accordance with the inventive technique.
Figure 10B:
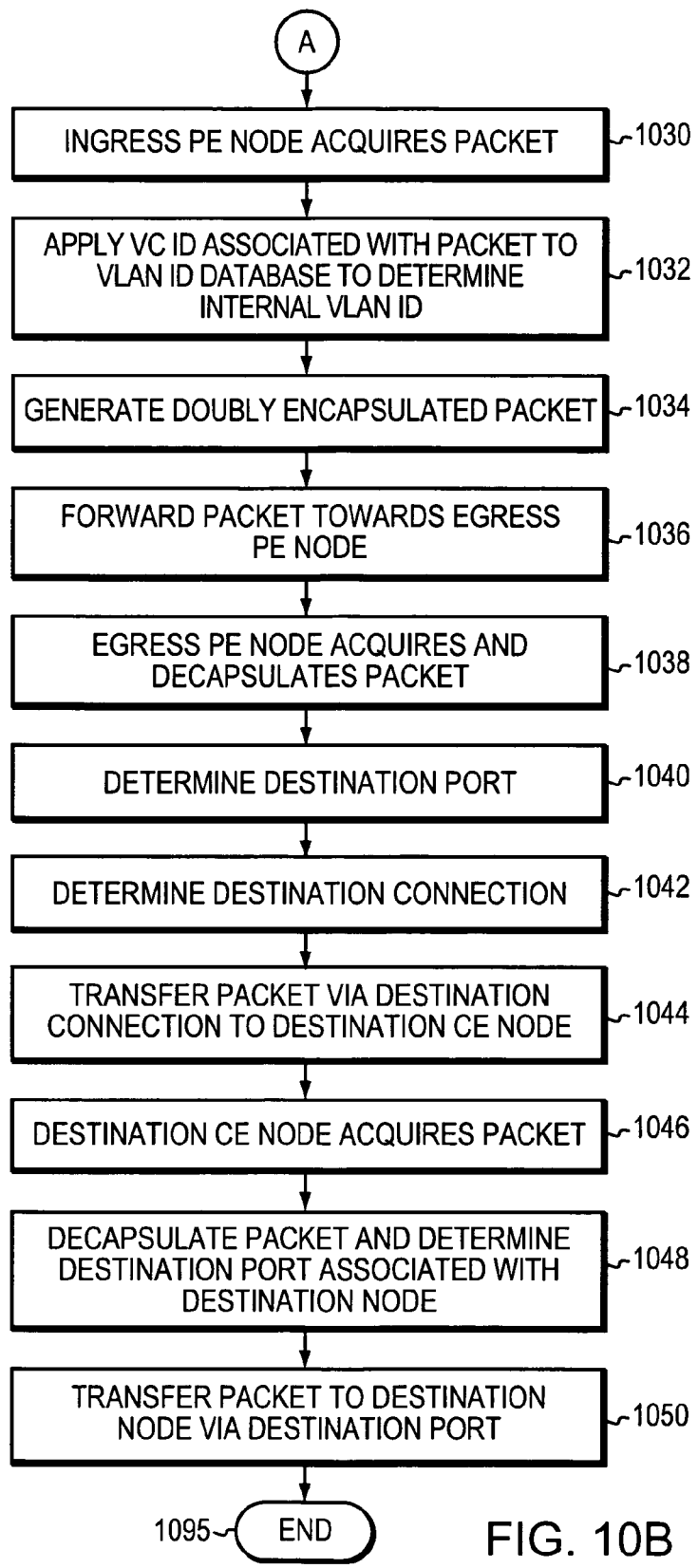

Assume, for illustrative purposes, that node 110a (source node) has a data packet for transfer to node 110d (destination node) and nodes 110a and 110d belong to the same VLAN. FIGS. 10A-B are flow charts illustrating a sequence of steps that may be used to transfer the data packet from source node 110a to destination node 110d via WAN 170 in accordance with the inventive technique. The sequence begins at Step 1005 and proceeds to Step 1007 where engine 290 establishes one or more virtual ports illustratively by populating the IDB 500 and VPORT VLAN 600 databases with information associated with the virtual ports including information associated with virtual ports as described above. These databases may be populated by issuing a series of commands that contain the information about the virtual ports to node 200. Node 200, in turn, processes the commands and populates the databases with the information. It will be apparent to one skilled in the art that other techniques may be used to populate the databases, including techniques such as pre-configuring the software contained in node 200 to populate the databases from e.g., data accessible to node 200.

At Step 1010 source node 110a generates illustratively a packet containing a destination address associated with destination node 110d, places the data in the packet and transfers the packet over link 122 to a port contained on CE node 200a. At Step 1012, CE node 200a acquires the packet from network 100 via e.g., a line card 240. At Step 1014 identifies a VLAN ID associated with the packet. Specifically, the forwarding engine 290 in node 200a applies a port ID associated with the port that acquired the packet to the IDB database 500 and selects an entry 510 in the database associated with the port. Engine 290 then identifies a VLAN ID associated with the packet. If the acquired packet contains a VLAN ID, such as with an 802.1Q type packet, engine 290 examines the packet to determine the VLAN ID associated with the packet; otherwise, engine 290 associates the packet with the default VLAN ID 560 specified in the selected entry 510.

At Step 1016, engine 290 identifies a virtual port associated with the destination node 110d. Specifically, engine 290 applies the destination address contained in the acquired packet and the VLAN ID associated with the packet to the forwarding database 300 to locate an entry 310 whose address 320 matches the destination address in the packet and whose VLAN ID 330 matches the VLAN ID associated with the packet. The port ID field 340 of the matching entry 310 contains an ID that identifies the virtual port associated with the destination node. The engine 290 applies the port ID 340 associated with the packet to the IDB database 500 to identify an IDB entry 510 associated with the virtual port (Step 1018).

Engine 290 then identifies a connection (e.g., VC) associated with the packet's VLAN (Step 1020). Specifically, engine 290 uses the VPORT VLAN database pointer field 540 of the matching IDB entry 510 to locate the VPORT VLAN database 600 associated with the virtual port. Engine 290 then applies the VLAN ID associated with the acquired packet to the VPORT VLAN database 600 to locate an entry 610 in the database 600 whose VLAN ID 620 matches the VLAN ID associated with the acquired packet. Engine 290 then associates the VC identified by the VC ID 620 of the matching entry 610 with the acquired packet's VLAN.

At Step 1026 engine 290 encapsulates the acquired packet to generate e.g., an 802.1Q singly encapsulated packet 400, as described above, wherein the VLAN ID of the VLAN associated with the acquired packet is specified in the VLAN ID field 438 of the packet 400 and values are generated and placed in the TCI field 432, priority (P) field 434 and CI field 436 in accordance with 802.1Q. Engine 290 then transfers the singly encapsulated packet 400 over the connection associated with the packet's VLAN to the provider network's ingress PE node 200*e* via link 130*a*.

At Step 1030 (FIG. 10B), the ingress PE node 200*e* acquires the packet 400 and its forwarding engine 290 applies the VC ID associated with the packet (e.g., the VC ID associated with the connection on which the packet was acquired) to the node's 200*e* VLAN ID database 700 to determine an internal VLAN ID associated with the packet (Step 1032). Specifically, engine 290 identifies an entry 710 whose VC ID 720 matches the VC ID associated with the singly encapsulated packet 400. Engine 290 then associates the internal VLAN ID 740 of the matching entry with the packet 400.

At Step 1034, the forwarding engine 290 encapsulates the singly encapsulated packet 400 to generate a doubly encapsulated packet 900 illustratively encapsulated as an 802.1Q-in-802.1Q packet. Specifically, engine 290 uses information contained in the source address field 420, length/type field 450, data field 460 and encapsulation information field 430 of packet 400 to generate information placed in the source address field 920, length/type field 950, and data field 960 of packet 900, respectively. Moreover, engine 290 uses information in the TCI field 432, priority (P) field 434, CI field 438 and VLAN ID field 438 to generate information placed in the TCI field 942, priority (P) field 944, CI field 946 and external VLAN ID field 948 of packet 900, respectively. Engine 290 then applies the destination address 410 contained in the packet 400 to the address translation database 800 to determine if the destination address 410 matches an external address 820 contained in the database 800. If so, engine 290 uses the internal address 840 to generate the destination address 910 of the packet 900. Otherwise, engine 290 uses the destination address 410 contained in packet 400 to generate the destination address 910. Engine 290 then uses the internal VLAN ID 740 of the matching VLAN database entry 710 to generate a value that is placed in the internal VLAN ID field 938 contained in the packet's outer encapsulation information 930 field. Moreover, engine 290 generates and places values in the TCI field 932, priority (P) field 934 and CI field 936 in the packet's outer encapsulation information field 930 in accordance with 802.1Q, and generates and places a FCS in the packet's FCS field 970.

Next, at Step 1036, PE node 200*e* forwards the doubly encapsulated packet 900 towards the egress PE node 200*f*. Specifically, node 200*e*'s engine 290 applies the packet's destination address 910 and the internal VLAN ID 938 to the forwarding database 300 and identifies a virtual port where the egress PE node 200*f* can be reached in a manner as described above. Engine 290 then locates the IDB database entry 510 associated with the virtual port and uses the VPORT VLAN database pointer 540 of the entry 510 to locate the VPORT VLAN database 600 associated with the virtual port. Next, engine 290 locates the VPORT VLAN database entry 610 associated with the identified internal VLAN 740, identifies the connection associated with the internal VLAN's VC ID 640 and forwards the packet 900 on the connection to the egress PE node 200*f*.

At Step 1038, egress PE node 200*f* acquires the doubly encapsulated packet 900 and its forwarding engine 290 decapsulates it by, e.g., removing the outer encapsulation information 930 and regenerating the packet's FCS to yield the singly encapsulated packet 400. Engine 290 then applies the destination address 410 to the address translation database 800 to determine if the database 800 contains an entry 810 whose internal address 840 matches the destination address 410 of the packet 400. If so, engine 290 replaces the destination address 410 contained in packet 400 with the external address 820 specified in the matching entry 810.

At Step 1040, engine 290 determines a destination port associated with the packet 400 by applying the destination address 410 of the packet 400 to its forwarding database 300, in a manner as described above. Next, at Step 1042, engine 290 determines (identifies) the connection associated with the VC ID 640 of the packet's VLAN in a manner as described above.

At Step 1044, engine 290 transfers the packet 400 over the connection to CE node 200*b*. At Steps 1046 and 1048, CE node 200*b* acquires the packet and its forwarding engine 290 decapsulates it by e.g., removing the encapsulation information 430 from the packet and regenerating the packet's FCS, to yield the original packet (i.e., packet generated by the source node 110*a*). CE 200*b*'s engine 290 applies the destination address 410 contained in the packet and the VLAN ID 438 contained in the removed encapsulation information 430 to its forwarding database 300, in a manner as described above, to identify an entry 310 containing a port ID 340 of the destination port where the destination node 110*d* can be reached. CE node 200*b* then transfers the packet to the destination node 110*d* via the destination port (Step 1050). The sequence ends at Step 1095.

It should be noted that in the above-described embodiment of the invention, data are transferred between nodes via connections, such as e.g., ATM VCs, wherein each VLAN is carried on a separate connection; however, this is not intended to be a limitation of the invention. In other embodiments of the invention, one or more VLANs are carried on trunked connections that enable data to be transferred between the nodes 200. Moreover, in yet other embodiments of the invention, each VLAN is associated with other types of connections, such as point-to-point protocol (PPP) connections and/or frame relay connections.

It should be further noted that connections associated with a particular virtual port may be a combination of connection types. This combination may include connections that are all of the same type, such as all PPP connections. Moreover, this combination may include connections of different types, such as some of the connections associated with the virtual port are frame relay type connections while others associated with the same virtual port are ATM VC type connections.

It should also be noted that in the above-described embodiment of the invention, 802.1Q encapsulation is used; however, this too is not intended to be a limitation of the invention. In other embodiments, other forms of encapsulation are used. For example, one form of encapsulation that may take advantage of the inventive technique involves simply a tag in the encapsulation information fields (e.g., fields 430, 930 and 940) that identifies e.g., the VLAN that carries the packet.

The foregoing description has been directed to specific embodiments of this invention. It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. In a data network comprising a plurality of nodes, a method for transferring data packets between a source node and a destination node contained in the network, wherein the source node and destination node belong to the same particular virtual-local-area network (VLAN), the method comprising the steps of:
    establishing a virtual port associated with the destination node, the virtual port supporting a plurality of connections that are each associated with a different VLAN, a particular connection associated with the particular VLAN;
    maintaining a single control structure for the virtual port, the single control structure storing information associated with each connection of the plurality of connections, the information including connection status and statistics for each connection of the plurality of connections;
    acquiring a data packet from the source node, wherein the packet is associated with the particular VLAN and contains a destination address associated with the destination node;
    applying the destination address contained in the packet and a VLAN ID that identifies the particular VLAN associated with the packet to a forwarding database to locate a forwarding database entry that contains (i) a destination address that matches the destination address contained in the packet and (ii) a VLAN ID that matches the VLAN ID that identifies the particular VLAN associated with the packet;
    identifying the virtual port associated with the destination node using a port identifier contained in the matching forwarding database entry; and
    transferring the packet to the destination node over the particular connection via the virtual port.

2. The method as defined in claim 1 wherein the single control structure includes an interface descriptor block (IDB) entry of an IDB database and the method further comprises the step of:
    applying a port identifier (ID) associated with the virtual port to the IDB database to identify the IDB database entry associated with the virtual port.

3. The method as defined in claim 2 wherein the identified IDB database entry contains a VLAN ID that represents the particular VLAN associated with the packet.

4. The method as defined in claim 1 wherein the packet contains the VLAN ID that identifies the particular VLAN associated with the packet.

5. The method as defined in claim 1 comprising the steps of:
    applying a port identifier (ID) associated with the virtual port to an interface descriptor block (IDB) database to identify an IDB database entry associated with the virtual port;
    locating a virtual port (VPORT) VLAN database using an address contained in the IDB database entry;
    applying a VLAN ID that identifies the particular VLAN associated with the packet to the VPORT VLAN database to locate a VPORT VLAN database entry that contains a VLAN ID that matches the VLAN ID that identifies the particular VLAN associated with the packet;
    encapsulating the packet; and
    transferring the encapsulated packet over a particular connection identified by a connection ID contained in the matching VPORT VLAN database entry.

6. The method as defined in claim 5 wherein the packet is encapsulated in accordance with the Institute of Electrical and Electronics Engineers (IEEE) 802.1Q standard.

7. The method as defined in claim 5 comprising the steps of:
    acquiring the encapsulated packet;
    decapsulating the acquired encapsulated packet to yield the original packet;
    applying the destination address contained in the original packet to an address translation database to determine if the destination address matches an internal address contained in an entry in the database; and
    if so, replacing the destination address in the original packet with an external address contained in the matching entry.

8. The method as defined in claim 1 wherein the particular connection is a point-to-point protocol (PPP) connection.

9. The method as defined in claim 1 wherein the particular connection is an Asynchronous Transfer Mode (ATM) virtual connection (VC).

10. The method as defined in claim 1 wherein the particular connection is a frame relay connection.

11. The method as defined in claim 1 wherein the particular connection is a trunked connection.

12. The method as defined in claim 1 wherein the particular connection is associated with a connection identifier (ID).

13. The method as defined in claim 12 comprising the step of:
    identifying an entry in a VLAN ID database that contains a virtual connection (VC) ID that matches the connection ID.

14. The method as defined in claim 12 comprising the steps of:
    acquiring an encapsulated packet on the particular connection;
    identifying an internal VLAN ID associated with the particular connection's ID; and
    doubly encapsulating the encapsulated packet wherein the doubly encapsulated packet contains the internal VLAN ID.

15. The method as defined in claim 14 wherein the doubly encapsulated packet is encapsulated in accordance with the Institute of Electrical and Electronics Engineers (IEEE) 802.1Q standard.

16. The method as defined in claim 14 comprising the steps of:
    applying a destination address contained in the doubly encapsulated packet to an address translation database to determine if the destination address matches an external address contained in an entry in the address translation database; and
    if so, replacing the destination address contained in the doubly encapsulated packet with an internal address contained in the matching entry.

17. In a data network comprising a plurality of nodes, a method for transferring data packets between a source node and a destination node contained in the network, wherein the source node and destination node belong to the same virtual-local-area network (VLAN), the method comprising the steps of:
    generating a data packet at the source node, wherein the data packet contains a destination address associated with the destination node;

transferring the packet to a source intermediate node contained in the network;

at the source intermediate node, (i) acquiring the packet, (ii) identifying a particular VLAN associated with the packet, (iii) applying the destination address contained in the packet and a VLAN ID that identifies the particular VLAN associated with the packet to a forwarding database to locate a forwarding database entry that contains a destination address that matches the destination address contained in the packet and a VLAN ID that matches the VLAN ID that identifies the particular VLAN associated with the packet; (iv) identifying a virtual port through which the destination node may be reached using a port identifier contained in the matching forwarding database entry, the virtual port supporting a plurality of connections that are each associated with a different VLAN, (v) maintaining a single control structure for the virtual port, the single control structure storing information associated with each connection of the plurality of connections, the information including connection status and statistics for each connection of the plurality of connections, (vi) identifying a particular connection that is associated with the virtual port and the packet's particular VLAN, and (vii) transferring the packet over the particular connection via the virtual port to a destination intermediate node contained in the network; and at the destination intermediate node, (i) acquiring the packet, (ii) identifying a port through which the destination node may be reached and (iii) forwarding the acquired packet to the destination node.

18. A method as defined in claim 17 comprising the step of:
at the source intermediate node, encapsulating the packet.

19. The method as defined in claim 18 wherein the packet is encapsulated in accordance with the Institute of Electrical and Electronics Engineers (IEEE) 802.1Q standard.

20. The method as defined in claim 17 wherein the particular connection is a point-to-point protocol (PPP) connection.

21. The method as defined in claim 17 wherein the particular connection is an Asynchronous Transfer Mode (ATM) virtual connection (VC).

22. The method as defined in claim 17 wherein the particular connection is a frame relay connection.

23. The method as defined in claim 17 wherein the particular connection is a trunked connection.

24. An intermediate node comprising:
a line card coupled to a network wherein the line card is configured to acquire data packets containing destination addresses; and
a processor configured to (i) establish one or more virtual ports wherein each virtual port is associated with a plurality of connections and each connection is associated with a virtual-local-area network (VLAN), (ii) associate an acquired packet with a particular VLAN, (iii) maintain a single control structure for the virtual port, the single control structure storing information associated with each connection of the plurality of connections, the information including connection status and statistics for each connection of the plurality of connections, (iv) apply the destination address contained in the packet and a VLAN ID that identifies the particular VLAN associated with the packet to a forwarding database to locate a forwarding database entry that contains a destination address that matches the destination address contained in the packet and a VLAN ID that matches the VLAN ID that identifies the particular VLAN associated with the packet, (v) identify a virtual port associated with a destination address contained in the acquired packet using a port identifier contained in the matching forwarding database entry, (vi) identify a particular connection associated with the VLAN and (vii) transfer the packet over the particular connection via the virtual port.

25. The intermediate node as defined in claim 24 wherein the connections are a combination of connection types.

26. The intermediate node of claim 24 wherein the single control structure includes an interface descriptor block (IDB) entry of an IDB database that is identified by a port identifier (ID) associated with the virtual port.

27. An apparatus for transferring data packets between a source node and a destination node contained in a data network, wherein the source node and destination node belong to the same particular virtual-local-area network (VLAN), the apparatus comprising:
means for establishing a virtual port associated with the destination node, the virtual port supporting a plurality of connections that are each associated with a different VLAN, a particular connection associated with the particular VLAN;
means for maintaining a single control structure for the virtual port, the single control structure storing information associated with each connection of the plurality of connections, the information including connection status and statistics for each connection of the plurality of connections;
means for acquiring a data packet from the source node, wherein the packet is associated with the particular VLAN and contains a destination address associated with the destination node;
means for applying the destination address contained in the packet and a VLAN ID that identifies the particular VLAN associated with the packet to a forwarding database to locate a forwarding database entry that contains (i) a destination address that matches the destination address contained in the packet and (ii) a VLAN ID that matches the VLAN ID that identifies the particular VLAN associated with the packet;
means for identifying the virtual port associated with the destination node using a port identifier contained in the matching forwarding database entry; and
means for transferring the packet to the destination node over the particular connection via the virtual port.

28. The apparatus of claim 27 wherein the means for maintaining comprise a interface descriptor block (IDB) database and the single control structure includes an IDB database entry identified by a port identifier (ID) associated with the virtual port.

29. A computer readable medium comprising computer executable instructions for execution in a processor, the medium comprising instructions for:
establishing a virtual port that is associated with a destination node, contained in a data network, the virtual port supporting a plurality of connections that are each associated with a different VLAN, a particular connection associated with a particular virtual-local-area network (VLAN);
maintaining a single control structure for the virtual port, the single control structure storing information associated with each connection of the plurality of connections, the information including connection status and statistics for each connection of the plurality of connections;
acquiring a data packet wherein the packet is associated with the particular VLAN and contains a destination address associated with the destination node;

applying the destination address contained in the packet and a VLAN ID that identifies the particular VLAN associated with the packet to a forwarding database to locate a forwarding database entry that contains (i) a destination address that matches the destination address contained in the packet and (ii) a VLAN ID that matches the VLAN ID that identifies the particular VLAN associated with the packet;

identifying the virtual port associated with the destination node using a port identifier contained in the matching forwarding database entry; and transferring the packet to the destination node over the connection via the virtual port.

* * * * *

UNITED STATES PATENT AND TRADEMARK OFFICE
CERTIFICATE OF CORRECTION

| | | |
|---|---|---|
| PATENT NO. | : 7,586,915 B1 | Page 1 of 1 |
| APPLICATION NO. | : 10/691830 | |
| DATED | : September 8, 2009 | |
| INVENTOR(S) | : Atri Indiresan et al. | |

It is certified that error appears in the above-identified patent and that said Letters Patent is hereby corrected as shown below:

Col. 6, Line 48, please amend as shown:

VLANs wherein[[ is]] each VLAN is associated with a connec-

Signed and Sealed this

Second Day of November, 2010

David J. Kappos
*Director of the United States Patent and Trademark Office*